United States Patent [19]

Rector et al.

[11] Patent Number: 5,779,887
[45] Date of Patent: Jul. 14, 1998

[54] GRAVITY SCREEN WITH BURDEN REMOVAL AND PORE-CLEANING MEANS

[75] Inventors: John J. Rector, Visalia; Thomas Lisy, Clovis, both of Calif.

[73] Assignee: Claude Laval Corporation, Fresno, Calif.

[21] Appl. No.: 778,055

[22] Filed: Jan. 7, 1997

[51] Int. Cl.$^6$ .......................... B01D 29/075; E02B 5/08
[52] U.S. Cl. .......................... 210/159; 210/408; 210/413
[58] Field of Search .......................... 210/159, 158, 210/162, 407, 408, 409, 410, 411, 412, 413

[56] References Cited

U.S. PATENT DOCUMENTS

| | | |
|---|---|---|
| 3,909,411 | 9/1975 | Angele et al. .......................... 210/159 |
| 5,246,573 | 9/1993 | Lodholz et al. .......................... 210/159 |
| 5,425,876 | 6/1995 | Rector .......................... 210/354 |
| 5,653,874 | 8/1997 | Berry, III .......................... 210/159 |

*Primary Examiner*—Robert Popovics
*Attorney, Agent, or Firm*—Donald D. Mon

[57] ABSTRACT

A burden removal system for removing solid burden from a stream of water. A screen has an upper and a lower surface with pores extending between them. The upper surface is substantially horizontal. A drive bar with a wiper bade is cyclically bi-directionally driven with the blade pushing burden along the upper surface in one direction and rising above the burden in the opposite direction. Jet sprays discharge water against the lower surface, preferably just ahead of the wiper blade to assist the blade in moving the burden and cleaning the pores.

3 Claims, 3 Drawing Sheets

GRAVITY SCREEN WITH BURDEN REMOVAL AND PORE-CLEANING MEANS

SPECIFICATION

FIELD OF THE INVENTION

A gravity screen for screening out burden such as debris and detritus from a water stream.

BACKGROUND OF THE INVENTION

Separation of solid burden from a water stream is conventionally accomplished with a screen having pores through which water will pass, but through which the burden will not pass. Woven screens are most frequently used, the size of their pores being determined by wire diameter and spacing.

Inherent problems are the necessity to remove the separated solids from the screen surface, and to keep the pores cleared so that water can flow through them.

Numerous expedients have been utilized in this crowded art, for example sloping the screen so that gravity will both draw the liquid through the pores, and also draw the burden downward along the top surface of the screen. Sometimes the downward movement of the burden is assisted by jets of water directed against the bottom of the screen, which tends to lift and to lubricate the movement of the burden during its downward passage, as well as to keep the pores cleared.

These expedients are insufficient for a horizontal screen, because they lack means to move the burden off of the screen surface. Scrapers can be utilized for this purpose, but the tendency of known scrapers is to press the solids into the screen pores, which tends to plug them.

It is an object of this invention to provide a horizontal screen with means to shove the debris across and off of the screen, while simultaneously clearing the pores, and lifting the burden immediately ahead of the blade to facilitate its removal.

BRIEF DESCRIPTION OF THE INVENTION

This invention is carried out in combination with a horizontal screen. The screen has an upper surface and a lower surface. Pores interconnect these surfaces, for example interstices formed by woven wires or assembled rods, or perforations in a metal plate. At least the upper surface is substantially flat.

According to this invention, a wiper blade in contact with the upper surface is moved along and against it so as to shove the burden toward a side of the screen. A water jet is directed upwardly against the lower surface of the screen, directed so as to enter the pores and move any burden in them toward the upper surface, preferably to clear the pores of burden.

The jet spray is mounted for simultaneous movement with the blade so as to be directed against the screen just ahead of the wiper blade. In this way, the burden just ahead of the blade will also be lifted to facilitate movement of the burden, at the same time when they are being wiped clean at the upper surface.

According to a preferred but optional feature of the invention, the blade and the jets are mounted to drive means which appropriately positions them relative to each other, and moves them simultaneously.

According to yet another preferred but optional feature of the invention, the drive means is adapted for bi-directional movement across the screen, with the blade in contact with the screen in a first direction, and lifted off of the screen for a return movement in a second, opposite, direction.

The above and other features of this invention will be fully understood from the following detailed description and the accompanying drawings, in which:

DETAIL DESCRIPTION OF THE INVENTION

Figure 1:
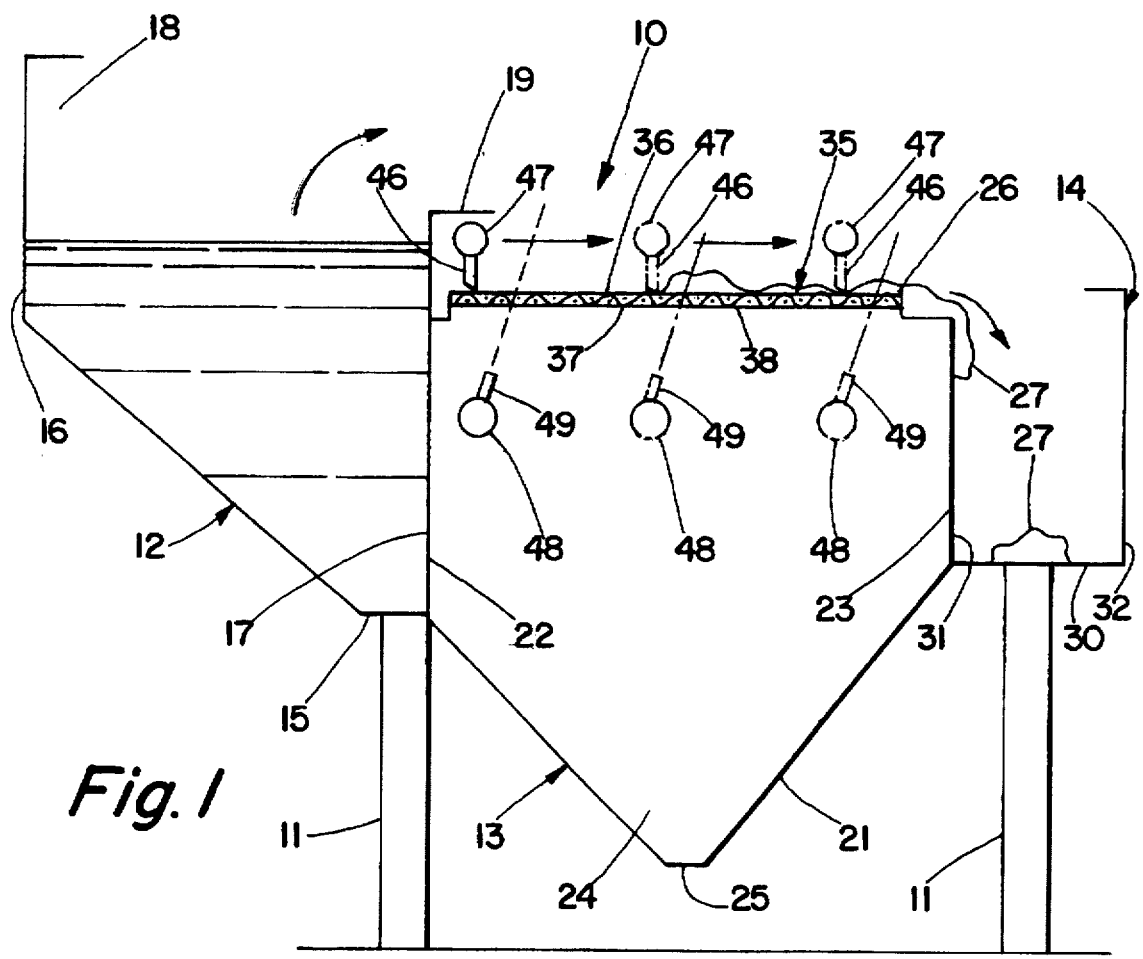
FIG. 1 is a side elevation showing the presently-preferred embodiment of the invention.
Figure 4:
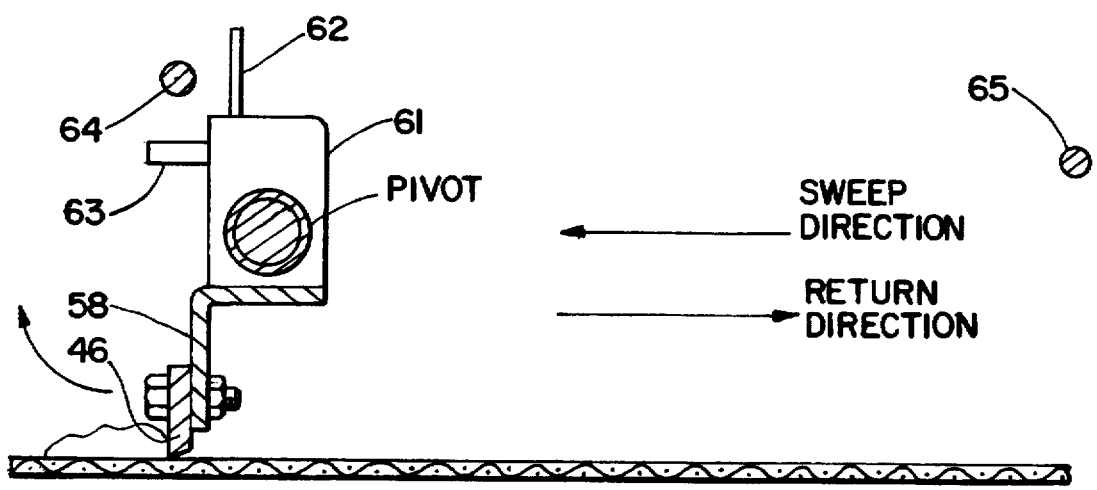
FIG. 4 is a schematic showing of the operation of the drive means.
Figure 2:
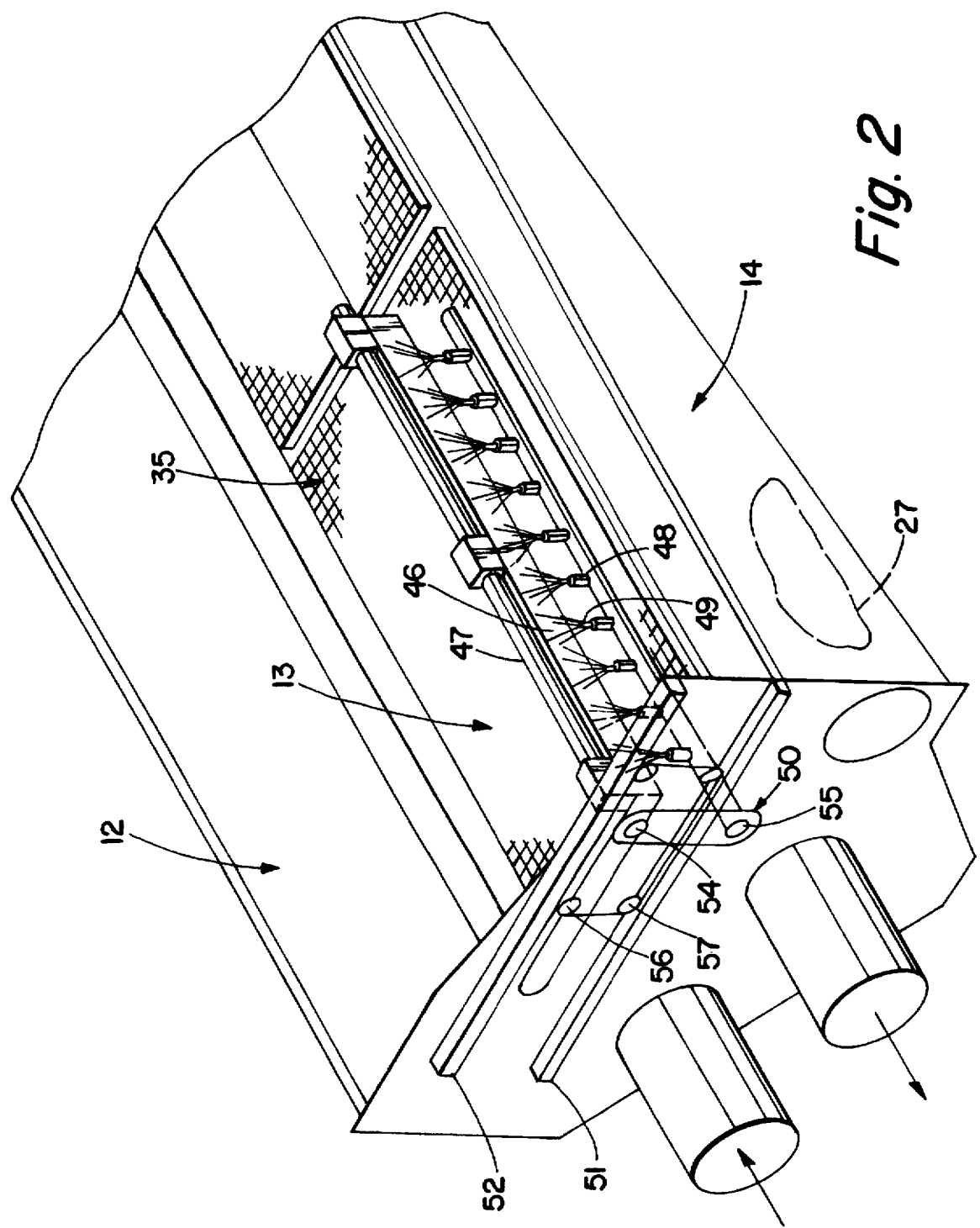
FIG. 2 is a perspective view, partly in cutaway section of a portion of FIG. 1.
Figure 3:
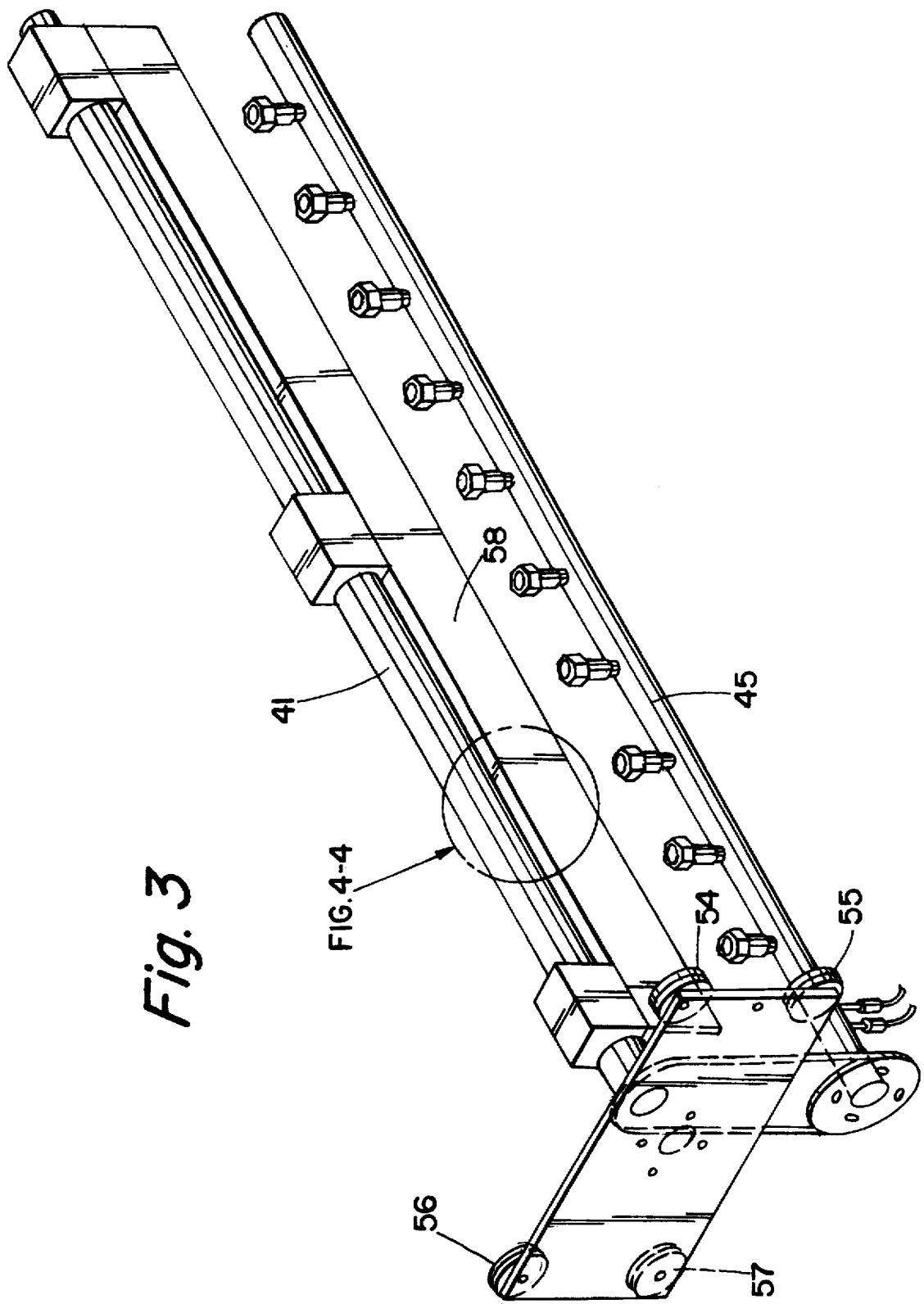
FIG. 3 is a partial perspective view of the drive portion of the invention.

A burden removal installation 10 according to the invention is shown in FIG. 1. It may conveniently be supported by legs 11, and includes three tanks 12, 13 and 14.

Raw feed tank 12 receives water together with burden to be removed. It has a bottom 15, sidewalls 16, 17 and end walls 18 (only one shown). Sidewall 17 terminates at its upper edge to form a weir 19 over which water and burden will flow when the tank is sufficiently filled.

Filtered water tank 13 receives water from which the burden has been removed. It has a bottom wall 21, sidewalls 22, 23 and end walls 24 (only one shown). Filtered water is removed from tank 13 through a drain 25. The upper edge of sidewall 23 terminates in a lip 26 over which removed burden 27 is shoved into a trash tank 14.

Trash tank 14 has a bottom 30 which may conveniently be sloped so that trash can slide or be shoved out into a receptacle. Sidewalls 31, 32 confine the trash (removed burden) to this region. One end wall may be provided if desired.

According to this invention a screen 35 overlays all or part of tank 13. It usually will be horizontal, but if desired may have a minor slope, no more than about 10 degrees. Placing the screen horizontally results in most effective gravity flow of the water through the screen.

The screen has an upper surface 36 and a lower surface 37. Pores 38 extend between these surfaces. Woven wire screens, spaced bars, and perforated plates, are examples of suitable screens. All of these are subject to blinding (clogging) by the burden.

To shove the burden across and off of the screen, a wiper blade 46 is positioned above the upper surface of the screen. It is pivotally mounted to a drive bar 47 which extends across the screen.

Beneath the lower surface of the screen, and above the water level in tank 13 is a spray bar 48. Spray bar 48 is a tubular header with a plurality of jets 49 along its length. These jets are directed upwardly toward the screen, preferably at an angle to the vertical toward the lip of the tank. Supply fittings including a hose (not shown) are provided to supply water under pressure to the spray bar. Filtered water from tank 13 can be used for this purpose, or water from any other source, as preferred.

Drive means 50 is provided appropriately to position and move the drive bar and the spray bar. Guide rails 51, 52 support and guide a mounting plate 53. Follower wheels 54, 55, and 56 and 57 on plate 53, are associated in pairs with rails 51 and 52. Plate 58 is attached to plate 53. Drive bar 41 is attached to plate 58, as is spray bar 45.

Power means 60 is linked to mounting plate 53 to move the plate (and the bars) bi-directionally along the rails.

It is intended that in a first direction of movement, the wiper blade will be in contact with the screen, and will move across the screen to shove burden toward and into trash tank 14. During its return movement, the blade is pivoted so as to lift above the burden and pass over it. When the return movement is completed, the blade will again be pivoted into contact with the screen.

For this purpose hinge plate 61 pivotally mounts the blade to the drive bar. It carries two limit arms 62, 63 (in different planes) which will contact a respective limit stop 64, 65 at respective ends of the drive stroke. Detent means (not shown) will retain the last setting of the blade until the next encounter of a limit arm and a limit stop. The wiper blade will thereby be in contact with the screen in one direction of movement, and will be above it in the return.

During the scraping movement, the water jets will be discharging against the lower surface of the screen, lifting the burden immediately ahead of the blade to assist the blade, and also to clear the pores.

When the blade has reached its limit and shoved the burden onto the lip, the power means will be reversed to return the wiper blade and the spray bar to the starting position.

Water from the spray bar may if desired be turned off during the return movement, or be left on, as preferred.

This installation provides optimum gravity separation of water, because it can use horizontal or nearly horizontal screens, without the blinding which would ordinarily be expected.

This invention is not to be limited by the embodiment shown in the drawings and described in the description, which is given by way of example and not of limitation, but only in accordance with the scope of the appended claims.

We claim:

1. A burden removal system for removing solid burden from a stream of water, said system comprising;

a screen having an upper surface, a lower surface, and a plurality of pores extending between said surfaces, at least said upper surface being substantially horizontal, to receive said stream with its burden, to pass water through said pores, and to retain burden on said upper surface;

a drive bar extending above and across said screen;

a wiper blade having a linear edge mounted to said drive bar;

a spray bar extending below and across said screen;

a plurality of jet sprays on said spray bar, said spray bar adapted to provide water under pressure to said jet sprays, said jet sprays discharging against said lower surface of said screen;

mounting means mounting said bars for simultaneous movement parallel to aid screen;

power means drivingly connected to said mounting means bi-directionally to drive said bars;

said wiper blade being mounted such that its linear edge moves in contact with the screen in a first direction of movement and is out of contact with the screen in a second opposite direction of movement so as to shove burden off of the screen in said first direction, and to pass over burden in its second direction, repetitive cycling of said power means causing periodic removal of burden from said screen, while the jets direct water upwardly into the pores to clear them of burden and lift some of the burden above the upper surface to assist the wiper blade in its removal of said burden.

2. Apparatus according to claim 1 in which said jet sprays are directed against said screen just ahead of the linear edge, whereby to clear said pores and to lift said burden just ahead of said wiper blade as it moves in contact with said screen.

3. Apparatus according to claim 2 in which said wiper blade is pivotally mounted to said drive bar, and in which limit arms and limit stops pivot the wiper blade into contact with the screen in said first direction, and out of contact with said screen in said second direction.

* * * * *